March 10, 1970 E. J. TOSCANO 3,500,022

REVERSIBLE ELECTRONIC DIGITAL COUNTER

Filed June 24, 1966 4 Sheets-Sheet 1

INVENTOR.
ESTEBAN J. TOSCANO,
BY
Victor Sepulveda
AGENT

United States Patent Office 3,500,022

Patented Mar. 10, 1970

3,500,022

REVERSIBLE ELECTRONIC DIGITAL COUNTER

Esteban J. Toscano, Los Angeles, Calif., assignor to Hughes Aircraft Company, Culver City, Calif., a corporation of Delaware Filed June 24, 1966, Ser. No. 560,294

Int. Cl. G06f *7/38;* G06g *7/00*

U.S. Cl. 235—92 1 Claim

ABSTRACT OF THE DISCLOSURE

A binary coded decimal FLIP-FLOP counter for counting pulses occurring at different times from two different sources in which gate circuits having fast recovery output circuits intercouple the FLIP-FLOPS in a counter configuration which always counts up from zero. The gate circuits provide parallel pulse coupling to the FLIP-FLOPS in an individual decade and alleviate the need for delaying pulse inputs during the pulse ripple period through the counter.

This invention relates to electronic digital counters in general and more particularly to a reversible electronic digital counter. Such a counter is defined as a signed counter, positive or negative, indicating that it is counting up on positive representing pulses or counting up on negative representing pulses and always counting up from a minimum or zero count. When the counter contains other than a zero count and when positively signed, the counter counts up in the presence of positive count representing pulses and counts down in the presence of negative count representing pulses. When negatively signed, the counter counts up in the presence of negative count representing pulses and counts down in the presence of positive count representing pulses.

Digital counters, as is well known in the art, have the capability of producing outputs in the form of discrete electrical signals indicative of the number of input pulses applied thereto. Further, these counters have the capacity to reverse the direction of counting, that is to count up or to count down either by sign control or by coupling input pulses to differing inputs.

A reversible counter is a useful device in industrial control applications requiring the positioning of movable elements. In many of these applications, high speed counting is important, particularly where high count capacity is required or where count pulse occurs at high frequencies.

One such application is in the field of machine tool controls for indicating when a movable element attains a pre-determined incremental position or for functioning as part of a position control system. Such a movable element may be a work table for milling machines or the like which has freedom of movement in one or more orthogonally related axes, one or more of which may have a zero position displaced from the mechanical limits of movement. One side of the zero position in an axis may be indicated by a positive sign and the other side may be indicated by a negative sign. Hence, a counter which counts individual increments of movement, adding counts for movement in a forward or positive going direction and subtracting counts for movement the reverse thereof on either side of a zero point in an axis, which always counts up from a count of zero and which indicates by its sign that side of the zero point on which movement is being counted is quite useful.

The present invention may employ the use of well-known logic elements for implementation of the preferred embodiments which will hereafter be described.

The well-known AND/OR logic gates may be employed in the following description as well as the familiar INVERTERS and FLIP-FLOPS logic circuitry. Monostable multi-vibrators hereafter referred to as ONE-SHOTS are used for pulse-shape restoration and stretching for one of the preferred embodiments described herein. Also in the latter preferred embodiments INHIBIT gates are used to replace the AND gates because of their extremely fast recovery times. In adddition, a unique INHIBIT gate is described which is extremely fast as compared to prior art INHIBIT gates as will be explained.

The present invention also employs, for these embodiments, the J–K FLIP-FLOP. As is well known to those skilled in the art, the J–K FLIP-FLOP is electrically bi-stable and is capable of changing electrical state in the presence of triggering pulses coupled simultaneously to the J and K input terminals. If a triggering input pulse is applied to the J terminal of a FLIP-FLOP already in that electrical state which results from such an input, herein called the true state, the FLIP-FLOP will not change electrical state. But if the FLIP-FLOP is in its false electrical state and the J input is enabled by a triggering pulse, the FLIP-FLOP will switch to its true electrical state. On the other hand should the FLIP-FLOP be in its true electrical state and its K input is enabled by a triggering pulse, the FLIP-FLOP will change or switch to its false electrical state. If the FLIP-FLOP is already in a false electrical state and a triggering pulse is coupled to its K input, the FLIP-FLOP will not change electrical state.

Briefly described, the present invention comprises a high speed, binary coded decimal, FLIP-FLOP counter having two input circuits, one a count up circuit and the other a count down circuit, for receiving triggering or count pulses from two different sources which preduce, at different times, count pulses to be counted. Fast recovery gate circits intercoupling the FLIP-FLOPS are coupled in parallel to the input circuits, respectively. Other fast recovery gate circuits under particular conditions selectively interchange the count pulses from said two different sources between said two input circuits, so that count pulses from either source may cause the counter to count up under particular conditions, and when the counter is at zero count, couple the count pulses from both sources to one input circuit. The invention provides high speed pulse counting in a reversible counter configuration which always counts up from zero.

The fast recovery gate circuits aforesaid are provided in one embodiment by unique INHIBIT gates in which gate enabling or opening or closing of the gate is substantially instantaneous to permit fast pulse gating and faster operation of the counter.

One object of this invention is to provide a novel and improved reversible counter which automatically reverses its direction of count when the contents of the counter is at its minimum digital level.

Another object of this invention is to provide a novel and improved reversible electronic digital counter which is capable of reversing count anywhere in its count cycle.

A further object of this invention is to provide a novel and improved reversible digital counter which is capable of either counting up or in a forward direction or down or in a backward direction and which always counts up from a minimum count such as zero.

A still further object of this invention is to provide a unique INHIBIT gate useful with a reversible electronic digital counter.

Yet a further object of this invention is to provide a unique INHIBIT gate useful with digital logic circuitry and which has a fast recovery time and thereby is capable of receiving discrete input signals at higher frequencies.

These and other objects and advantages will hereafter become more fully apparent to those skilled in the art from a study of the following detailed description of preferred embodiments of the invention in conjunction with the accompanying drawings.

Figure 6:
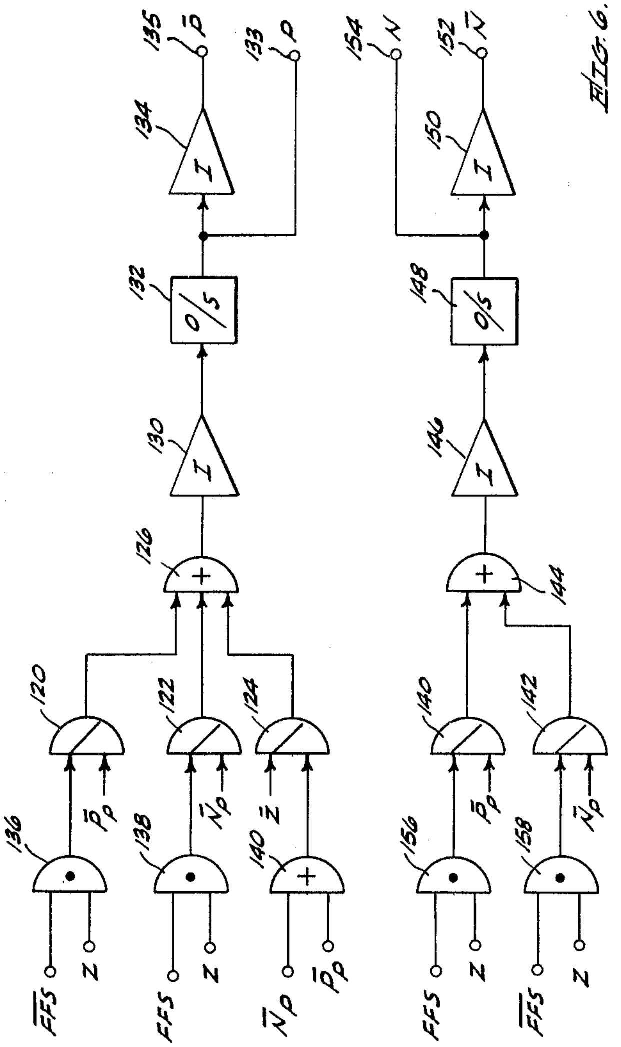
FIGURE 6 is a schematic diagram illustrating a second embodiment of a gating system for producing two different sets of count pulses.
Figure 7:
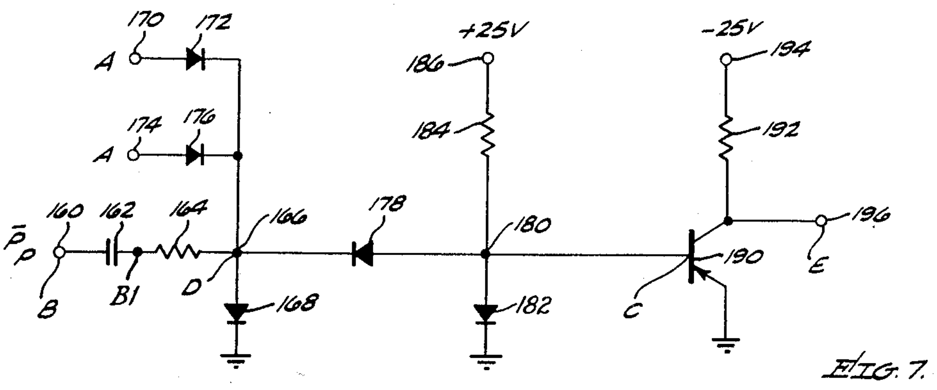
Figure 8:
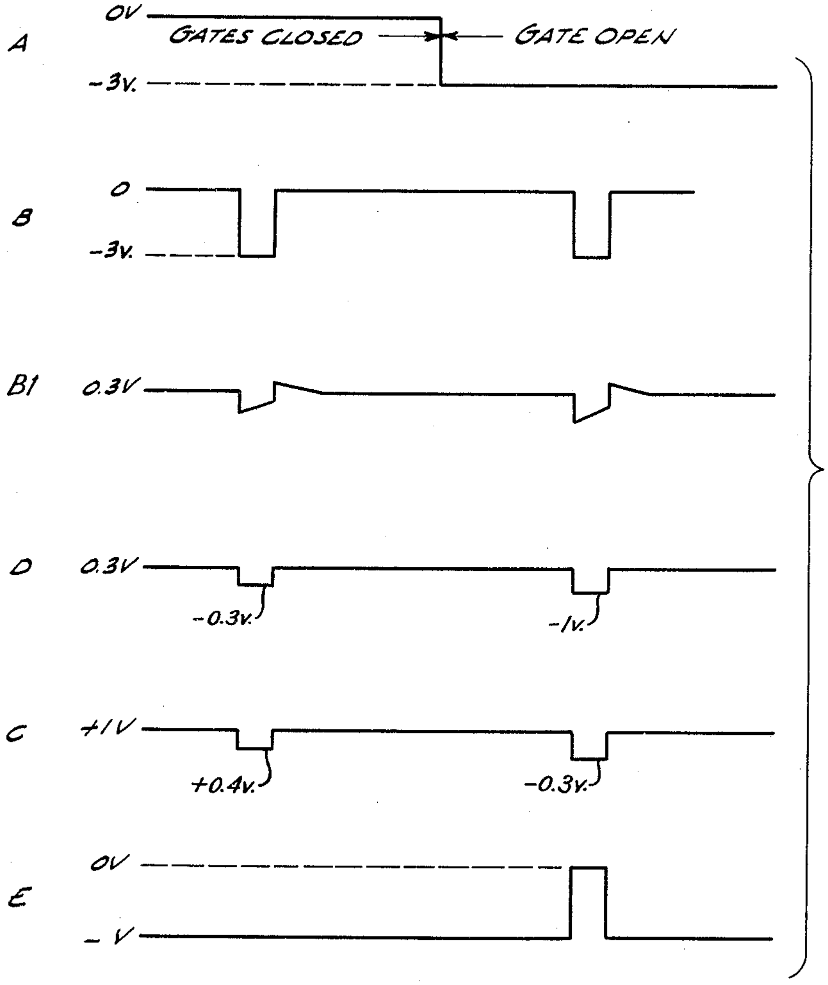

FIGURE 7 diagrammatically illustrates the details of an INHIBIT gate used in the gating system of FIGURE 6; and FIGURE 8 graphically depicts the voltages at selected points in the circuit shown in FIGURE 7.

GENERAL DESCRIPTION

Figure 1:
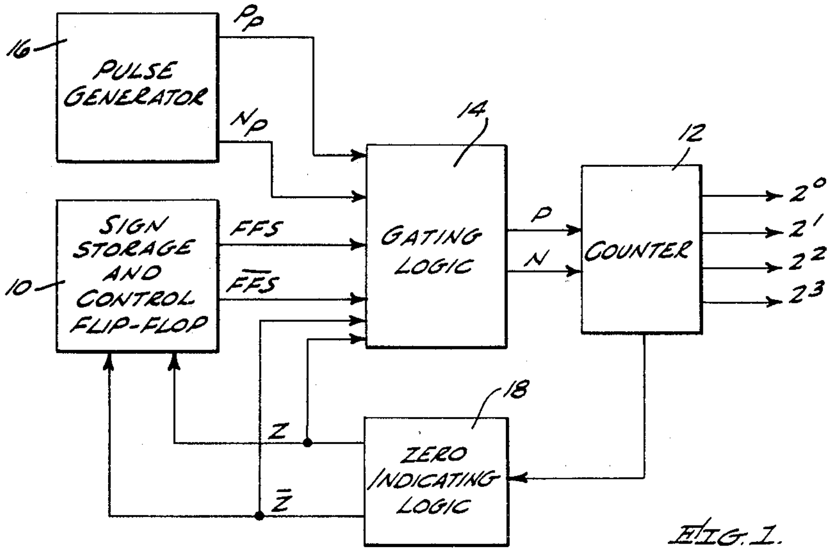
FIGURE 1 is a block diagram of a two input reversible counter embodying the principles of this invention.
Figure 2:
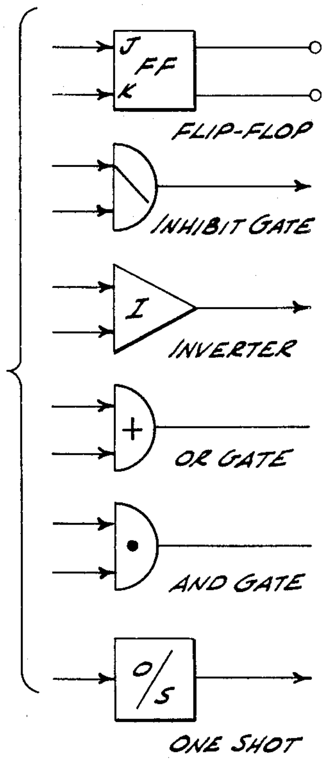
FIGURE 2 illustrates the symbols and identifies the logical circuit components represented by the symbols as used in the drawings in illustrating this invention.

The reversible counter arrangement of the present invention as illustrated in the generalized block diagram of FIGURE 1 comprises a sign storage and control FLIP-FLOP 10, a counter 12 having a count up input circuit for receiving pulses P and a count down input circuit for receiving pulse N, gating logic circuits 14 which provide the output pulses P and N for causing the counter 12 to count up and to count down respectively; a pulse generator 16 which provides count pulses $P_P$ and $N_P$ which are coupled to gating logic circuits 14 where either may be gated as a pulse P or a pulse N depending upon the electrical state of the FLIP-FLOP 10 and the state of the counter 12 or depending solely upon the state of the counter; and zero indicating logic circuits 18 which trigger the FLIP-FLOP 10 to a first electrical state FFS if the contents of counter 12 is zero (Z) and to a second electrical state $\overline{FFS}$ if the contents of counter 12 is not zero ($\overline{Z}$). The FLIP-FLOP 10 being bi-stable provides a memory for storing the sign of the counter 12. If the sign is positive (FFS), the counter will count up in the presence of $P_P$ pulses and will count down in the presence of $N_P$ pulses. If the sign is negative, the counter counts up on pulses $N_P$ and down on pulses $P_P$. This operation is achieved when the sign of the counter is positive, i.e., the FLIP-FLOP 10 is true (FFS) by using the signal FFS along with a signal $\overline{Z}$ showing the counter is not at a count of zero to channel the pulses $P_P$ emanating from the pulse generator 16 through gating logic circuits 14, as pulses P to cause the counter 12 to count up (i.e., 0, 1, 2 . . . 9). In this situation the pulses $N_P$ are gated as pulses N to cause the counter 12 to count down (9, 8, 7 . . . 0). The electrical state of FLIP-FLOP 10 in turn is controlled by the contents of counter 12 through the zero indicating logic circuits 18. Each time counter 10 is in the electrical configuration of zero count, its output causes the FLIP-FLOP 10 to change electrical state and thereby count up in the presence of the pulses which counted it down. For these embodiments, when the contents of counter 12 is zero the zero indicating logic circuits 18 cause counter 12 to count up regardless of whether the count pulses $P_P$ or $N_P$ are emanating from the pulse generator 16. Pulse generator 16 provides the desired count pulses which are to be counted. For each pulse $P_P$ which represents movement in one direction in the X axis, for example, counter 12 increments one count regardless of whether counter 12 is in its negative mode (one side of the X axis zero point) or its positive mode (opposite side of the X axis zero point). It should be here understood that the pulses $P_P$ will cause the contents of counter 12 to increase in value if operating in the positive (FFS) mode and decrease in value if operating in the negative mode (FFS). It follows then that if the counter 12 is in the negative mode the pulses $N_P$ will cause the contents of counter 12 to increase in value and if the counter 12 is not in the positive mode the pulses $N_P$ will cause the counter 12 to decrease in value, the incremental pulses $P_P$ and $N_P$, for example, may indicate finite movements of the aforesaid work table for which this counter is useful.

GATING LOGIC

The gating logic circuits 14 provides two outputs, N and P to the counter 12 which are pulses to direct counter 12 to count up (P) or count down (N) and the terms P and N can be defined by the following equation stated in Boolean algebra:

(Equation 1)

$$P=(\overline{FFS}.\overline{Z}.P_P)+(FFS.\overline{Z}.N_P)+Z(P_P+N_P)$$
$$N=(FFS.\overline{Z}.N_P)+(\overline{FFS}.\overline{Z}.P_P)$$

Figure 3:
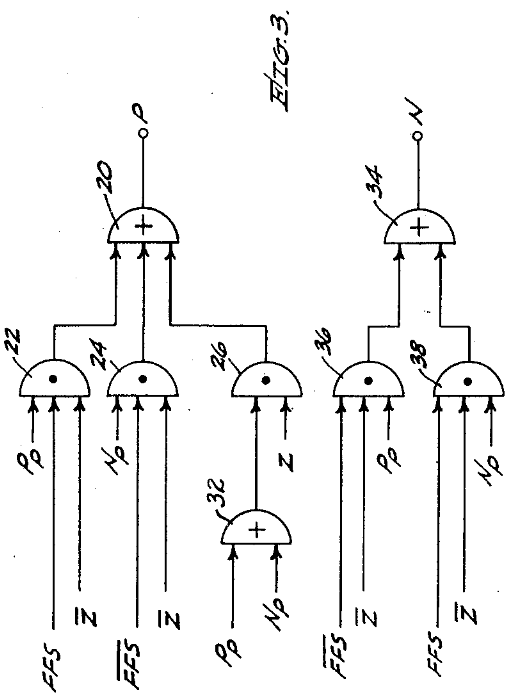
FIGURE 3 is a schematic diagram illustrating the logical configuration of a reversible counter embodying the principles of this invention.

For implementation of the above equation, reference is made to FIGURE 3 which diagrammatically illustrates one form of the gating logic circuits 14.

These gating circuits comprise an OR gate 20 which when enabled produces the pulses P for count up of counter 12. OR gate 20 is enabled by AND gates 22, 24 or 26. AND gate 22 is enabled by signal FFS from FLIP-FLOP 10 indicating that the sign of the counter 12 is positive and the counter is counting in the positive mode and the term $\overline{Z}$ from zero indicating logic circuits 18 indicating the contents of counter 12 is not at zero. When enabled, the gate 22 gates the count pulses $P_P$.

The AND gate 24 is enabled by the signals $\overline{FFS}$ and $\overline{Z}$. The signal FFS indicates that the sign of the counter 12 is negative and the counter is operating in the negative mode to count up on pulses $N_P$. The term $\overline{Z}$ indicates the contents of counter 12 is not at zero. The final enabling term presented to OR gate 20 comes from the AND gate 26 which in turn is in enabled by the signal Z and the output from an OR gate 32 which gates either of the signals $P_P$ or $N_P$ from pulse generator 16.

For providing the pulses N to the counter 12 to cause count down operation to decrease the count, an OR gate 34 is provided which is enabled by either an AND gate 36 or an AND gate 38. AND gate 36 is enabled by the signals $\overline{FFS}$ and $\overline{Z}$ for gating the pulses $P_P$ as pulses N.

AND gate 38 is enabled by the signal FFS indicating the sign of the counter is positive and by the signal $\overline{Z}$ indicating the counter 12 is not at zero count, for gating the pulses $N_P$ as the pulses N.

Thus, it now can be seen from the above equation and the explanation of the arrangement and function of the gating circuits of FIGURE 3, that if counter 12 is at zero count it makes no difference whether a pulse $N_P$ or a pulse $P_P$ is applied to the gating logic circuits 14 from pulse generator 16 because a pulse P will always be generated on the output of the gating logic circuits 14 causing the counter 12 to count up one count for the initial pulse. The counter 12 is thereafter no longer at zero count and the zero indicating logic circuit 18 produces the signal $\overline{Z}$. If the counter had been counted down by pulses $N_P$ during the intervals when signals FFS and $\overline{Z}$ were at gating level, which enables AND gates 22 and 38, the change in the counter sign signal from signal FFS to signal $\overline{FFS}$ as the counter goes through zero count enables gate 24 at the count of 1 (signal $\overline{Z}$) and the pulses $N_P$ are gated as pulses P. The sign of the counter is now negative. If the counter had been counted down by the pulses $P_P$, in which case the signals $\overline{FFS}$ and $\overline{Z}$ would have existed, counting up in the presence of pulses $P_P$ would occur when the signal $\overline{FFS}$ changed to FFS and the signal $\overline{Z}$ again reached gating level.

COUNTER

Figure 4:
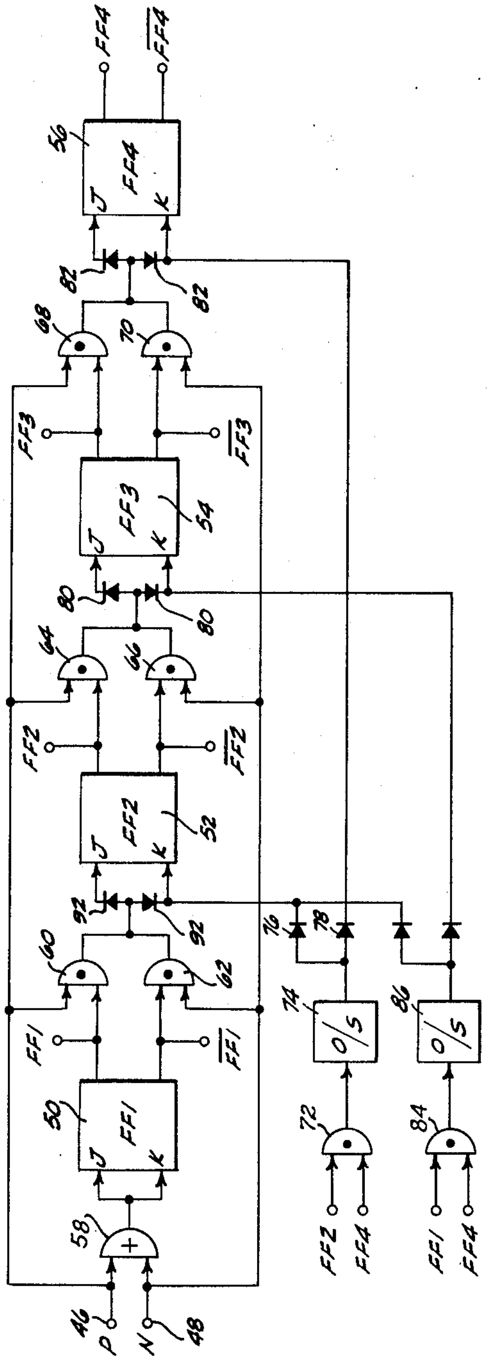
FIGURE 4 is a diagram illustrating one embodiment of a gating system for producing two different sets of count pulses.

Referring to FIGURE 4 which illustrates one decade of a binary coded decimal counter, the pulses P and N are presented to the terminals 46 and 48 respectively and as previously discussed a pulse P causes counter 12 to count up one count and a pulse N causes counter 12 to decrease one count.

The counter of this embodiment comprises four JK FLIP-FLOPS, 50, 52, 54 and 56. As previously stated and as hereafter used in connection with counter 12 the J and K inputs to the JK FLIP-FLOPS are physically coupled together to cause the FLIP-FLOPS to change electrical state upon each single pulse applied thereto. The FLIP-FLOPS of the counter 12 are coupled for switching or triggering in accordance with the following equation:

(Equation 2)

$$FF1=P+N$$
$$FF2=FF1.P+\overline{FF1}.N$$
$$FF3=FF2.P+\overline{FF2}.N$$
$$FF4=FF3.P+\overline{FF3}N$$

FIGURE 4 illusrates an example of a schematic drawing diagram for implementation of the above equation. FLIP-FLOP 50 which produces the signals FF1 and $\overline{FF1}$ is triggered by the output of an OR gate 58 which in turn may be enabled by either of the pulses P or N from the gating logic circuits 14 on the terminals 46 and 48 respectively.

The state of FLIP-FLOP 52 which produces output signals FF2 and $\overline{FF2}$, is changed by an output pulse from an AND gate 60 or an AND gate 62 wherein AND gate 60 is enabled by the output signal FF1 term from FLIP-FLOP 50 for gating a pulse P from terminal 46. AND gate 62 is enabled by the output signal $\overline{FF1}$ from FLIP-FLOP 50 for gating a pulse N from terminal 48. The FLIP-FLOP 54 which produces output signals FF3 and $\overline{FF3}$ will change states upon receiving an output from either an AND gate 64 or an AND gate 66 wherein AND gate 64 is enabled by the output signal FF2 from FLIP-FLOP 52 for gating a pulse P. AND gate 66 is enabled by the output signals $\overline{FF2}$ for gating a pulse N from input terminal 48.

Finally, tht FLIP-FLOP 56 which produces output signals FF4 and $\overline{FF4}$, will change states by either the output from AND gate 68 or AND gate 70 wherein AND gate 68 is enabled by the output signal FF3 from the FLIP-FLOP 54 for gating a pulse P from terminal 46 and the AND gate 70 is enabled by the output signal $\overline{FF3}$ from FLIP-FLOP 54 for gating a pulse N from terminal 48.

Each FLIP-FLOP, 50, 52, 54 and 56, of counter 12 is weighted. The binary weights are $2^0$, $2^1$, $2^2$, and $2^3$, respectively, and the count sequence can best be shown by referring to Table I.

TABLE I

| Count | FF1 | FF2 | FF3 | FF4 |
|---|---|---|---|---|
| 0 | 0 | 0 | 0 | 0 |
| 1 | 1 | 0 | 0 | 0 |
| 3 | 0 | 1 | 0 | 0 |
| 2 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 0 | 0 | 0 | 0 | 0 |

For operation of counter 12 shown in FIGURE 4 and with reference to Table I, it can be seen that either a pulse P or a pulse N will cause the FLIP-FLOP 50 to change states. Therefore, if FLIP-FLOP 50 is false or in its zero state either a pulse P or a pulse N will cause FLIP-FLOP 50 to go true. Note also that the pulses N and P are also coupled in parallel to all the other FLIP-FLOPS in counter 12 but because all of these FLIP-FLOPS are at zero in this assumption, the associated AND gates 60, 62, 64, 66, 68 and 70 will not be enabled to gate pulses. Thus the FLIP-FLOP 52, FLIP-FLOP 54 and the FLIP-FLOP 56 will remain in their zero state or false. The next pulse P applied to terminal 46 will cause the FLIP-FLOP 50 to go false so that signal $\overline{FF1}$ is at gate enabling level, causing the FLIP-FLOP 52 to switch to its true state because before FLIP-FLOP 50 changed to false it was applied simultaneously with a pulse P to the AND gate 60 and therefore FLIP-FLOP 52 changed to true causing the counter to switch to a configuration representing a count of two (2), as shown in Table I. The sequential operation continues as the pulses P are applied to terminal 46 until the counter reaches a count of nine (9).

It can be seen that if the pulses N are applied to terminal 48 and appropriate FLIP-FLOP output signals $\overline{FF1}$, $\overline{FF2}$, $\overline{FF3}$ and $\overline{FF4}$ are applied to the FLIP-FLOPS in the counter, the counter will count down.

Because it is generally normal to have the binary coded decimal counter 12 operate in decades, of which only the units decade is shown for providing binary coded decimal outputs, further logic circuitry is required to cause counter 12 to carry over its binary coded decimal sequence from 9 to 0; that is, from 1001 to 0000. This circuitry comprises an AND gate 72 which is enabled by the FLIP-FLOP output signals FF2 and FF4. The output from AND gate 72 is coupled to a ONE-SHOT circuit 74, the output of which is presented to the K input terminal of FLIP-FLOP 52 and also to the K input of the FLIP-FLOP 54 through isolation diodes 76 and 78 respectively.

Referring again to Table I note that when a 9 count is attained, the next binary count should be 1010 (most significant digit on the left) which is the decimal number 10. This being a binary coded decimal counter such a number is not allowed. Therefore, as soon as the output signals FF2 and FF4 are present on their outputs they are immediately applied to the K input terminal of FLIP-FLOP 52 and the K input of FLIP-FLOP 56 forcing both of these FLIP-FLOPS to re-set to zero. Note that a pair of isolation diodes 92 and 82 are provided to prevent these signals of AND gate 72 from also being applied to the J input terminals of FLIP-FLOP 52 and FLIP-FLOP 56, thereby forcing all FLIP-FLOPS in counter 12 to zero. The ONE-SHOT circuit 74 is provided to introduce a time delay in the application of a FLIP-FLOP triggering signal to the FLIP-FLOPS 52 and 56, in response to the signal emanating from the AND gate 72. This prevents the FLIP-FLOPS 52 and 56 from turning off too soon, that is, before the remaining FLIP-FLOPS havs a chance to change to zero in response to the pulse P.

The same situation occurs during counting down when the counter configuration is changing from 0 to 9. Circuitry is here provided in the form of AND gate 84 which is enabled by the FLIP-FLOP signals FF1 and FF4. The output from AND gate 74 is applied to a ONE-SHOT circuit 86 and the output of the ONE-SHOT circuit 86 is applied to the K inputs of FLIP-FLOP 52 and FLIP-FLOP 54, FLIP-FLOP 52 having an isolation diode 92 to prevent signals from the output of AND gate 84 from being applied to the J input of FLIP-FLOP 52. When the number 0000 is contained in counter 12 the next N pulse to terminal 48 will cause the counter 12 to switch to the configuration of FLIP-FLOP electrical states representing the binary number 1111 which again is a non-allowable number. Therefore, when the output signals FF1 and FF4 are true, the AND gate 84 is enabled, thereby forcing the FLIP-FLOP 52 and the FLIP-FLOP 54 false, causing the counter 12 to skip its sequence of count so that the FLIP-FLOP electrical states now represent the binary number 1001, thereby providing binary coded decimal count down counting.

ZERO INDICATING LOGIC

Figure 5:
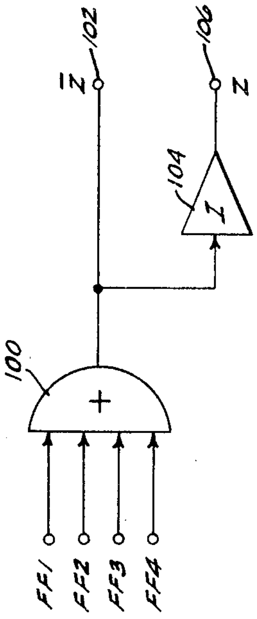
FIGURE 5 is a schematic drawing of the zero count indicating logic circuit used with this invention.

Referring now to FIGURE 5 an OR gate 100 is enabled by any one of the output signals FF1, FF2, FF3 or FF4 from the counter 12. Output terminal 102 will provide the output signal $\overline{Z}$ if any one of the inputs to the OR gate 100 is true. Also coupled to the output of the OR gate 100 is an INVERTER 104 which has an output terminal 106 and which provides the output signal Z.

INHIBIT GATING LOGIC

Equations No. 1 and No. 2 can also be implemented by using fast recovery INHIBIT gates. FIGURE 6 symbolically illustrates the implementation of equation No. 1 wherein INHIBIT gates and INVERTERS are used to replace the AND gates. FIGURE 6 illustrates three INHIBIT gates 120, 122 and 124, each of which has a pair of inputs, one of which is an inhibiting term and the other being a pulse to be gated. The pulses are $\overline{P}_P$ or $\overline{N}_P$ which are simply inverted pulses from pulse generator 16. All output terminals of INHIBIT gates 120, 122 and 124 are coupled to the input terminals to an OR gate 126. The output of OR gate 126 is coupled to an INVERTER 130 and the output of INVERTER 130 is, in turn, coupled to the input of a ONE-SHOT circuit 132. The output of the ONE-SHOT circuit 132 provides the pulse P on terminal 133 and is also coupled to an INVERTER 134, the output of which provides the inverted pulse $\overline{P}$ on a terminal 135.

The logic function of gates 136, 138, 140, 156, 158, 126 and 144 may be incorporated in the INHIBIT gate per se as shown in FIGURE 7 yet to be discussed.

The inhibit term applied to INHIBIT gate 120 emanates from an AND gate 136 which is enabled by signals $\overline{FFS}$ and Z for gating a pulse $\overline{P}_P$. The use of an inverter in the fast recovery INHIBIT gates in the counter 12 requires the use of inverted logic as the input to the gates. Thus the inverted terms on the inputs to the fast recovery INHIBIT gates have the same logical significance as the terms of Equation No. 1 and No. 2. Thus in this logic $\overline{Z}$ corresponds to Z, $\overline{FFS}$ corresponds to FFS, etc. The gate 136 is enabled by signals $\overline{FFS}$ and Z, the inverse of the corresponding signals of Equation No. 1. The output of AND gate 136 enables the gate 120 which gates a pulse $\overline{P}$ via an OR gate 126 through an inverter 130 a ONE-SHOT circuit 132 to an output terminal 133 as a pulse P. An inverter 134 provides a pulse $\overline{P}$.

The output waveforms from INHIBIT gates of this nature as will be explained in more detail later are in the form of a spike and therefore must be re-shaped by proper RC time constant circuits by circuits such as the ONE-SHOT circuit 132.

INHIBIT gate 122 has its inhibiting input coupled to an AND gate 138 which in turn is enabled by the signals FFS and Z which, again, are the inverse of the corresponding representatives of Equation No. 1. The signals FFS and Z enable gating of the pulses $\overline{N}_P$ presented to INHIBIT gate 122. INHIBIT gate 124 is enabled by the signal $\overline{Z}$, which in this inverted logic indicates the counter is zero, to gate pulses $\overline{P}_P$ or $\overline{N}_P$ from the OR gate 126.

For providing N or $\overline{N}$ (N for the conventional gates, $\overline{N}$ for the fast recovery INHIBIT gate) pulses to counter 12, a pair of INHIBIT gates 141 and 142 have their outputs applied to an OR gate 144. The output of OR gate 144 is coupled through an INVERTER 146 to a ONE-SHOT circuit 148. The output of the ONE-SHOT circuit 148 is coupled through an INVERTER 150 to terminal 152 and provides the pulse $\overline{N}$ to counter 12. The output of the ONE-SHOT circuit 148 is also coupled to terminal 154 and provides pulse N for counter 12. INHIBIT gate 141 receives a signal from the AND gate 156 which is enabled by the signals FFS and Z. A pulse $\overline{P_P}$ will be applied to OR gate 144 when the gate 141 is enabled. INHIBIT gate 142 is controlled by the AND gate 158 which is enabled by the signals $\overline{FFS}$ and $\overline{Z}$. INHIBIT gate 142 will gate a pulse $\overline{N_P}$ to OR gate 144 when the signals $\overline{FFS}$ and Z are at the gate enabling voltage.

The advantage of using the logic circuit empolying fast recovery INHIBIT gates rather than the use of conventional AND and OR gates as shown in FIGURE 3, is that INHIBIT gates of the character of FIGURE 7, yet to be described, are much faster in recovery and permit higher frequency pulse gating. Additionally the counter configuration of each decade eliminates the need for delaying pulse applications during pulse ripping through the counter.

INHIBIT GATE

Referring now to FIGURE 7 there is shown the unique INHIBIT gate of this invention which, for example, might be represented by the INHIBIT gate 120 of FIGURE 6. The circuit of FIGURE 6 is symbolic and the AND gate function is shown separately from the INHIBIT gate. FIGURE 7 combines this function and, in fact, in the provision of coupling diode 178 provides an output at an output terminal 180 which may be commonly coupled with a corresponding terminal of the gates to provide the function of an OR gate such as the gate 136 of FIGURE 6. The circuit comprises an input terminal 160 which may receive for example a pulse $P_P$. Terminal 160 is coupled in series with a capacitor 162 and a resistor 164 to a common junction 166. Also coupled to the common junction 166 is the anode of a diode 168 and the cathode of which may be coupled to ground reference. A terminal 170 may receive for example the signal $\overline{FFS}$ (gate 136 of FIGURE 6) and be coupled to the anode electrode of a diode 172, the cathode of which is coupled to the junction 166. A terminal 174 may receive for example a signal Z (gate 136 of FIGURE 6) and be coupled to the anode electrode of a diode 176. The cathode electrode of diode 176 is also coupled to the junction 166. A diode 178 has its cathode electrode coupled to the junction 166 and its anode electrode coupled to a junction 180. A diode 182 has its anode electrode coupled to the junction 180 and its cathode electrode coupled to the ground reference. A resistor 184 is coupled between junction 180 and a terminal 186. A potential of 25 volts, for example, may be applied to the terminal 186. A pnp transistor 190 has its base electrode coupled to the junction 180, its emitter electrode coupled to the ground reference and its collector electrode coupled through a resistor 192 to a terminal 194 which may have for example a potential of −25 volts applied thereto. Also coupled to the collector of transistor 190 is an output terminal 196 which, for example, may provide the P output for counter 12.

This circuit uses pulse INHIBIT gates followed by an INVERTER. It accepts inverted pulse inputs on a terminal 160 wherein a true signal (ground) on an inhibit input either terminal 170 or terminal 174 will inhibit transistor 190 from turning on as the pulse input swings negative. A $\overline{P}_P$ pulse input will cause transistor 190 to turn on and generate the P term on terminal 196.

When either input terminal 170 or 174 is at ground, function 166 will normally lie at about 0.3 volt. This is the voltage from 25 volts applied to terminal 186 through diode 178 and diode 168 to ground. Since the pulses $\overline{P_P}$ swing between 0 v. and −3 v., pulse gating is inhibited. The inhibit terms $\overline{FFS}$ or Z may be true at 0 volt (ground) or false at −3 volts, as shown in FIGURE 8, graph A. When a pulse $\overline{P_P}$ term as shown in graph B of FIGURE 8 is applied to the terminal 160 the states of the signal $\overline{FFS}$ on terminal 170 and the signal Z on terminal 174 becomes the determining factor for enabling the gate and providing the P term on terminal 196. If the signals $\overline{FFS}$ and Z are false (—3 volts), the gate is opened and a pulse $\overline{P_P}$ on terminal 160 will cause the voltage at junction 166 to be at a —1 volt (graph C, FIGURE 8) where it is clamped by diode 178 and the emitter/base junction of transistor 190. This —1 volt is formed by the —0.7 volt drop across diode 178 and a —0.3 volt across the emitter/base junction of transistor 190. Transistor 190 turns on and provides the P pulse as shown in graph E of FIGURE 8 from the —25 volts at terminal 194 to ground. Transistor 190 will remain on until $\overline{P_P}$ goes back to zero volt or until capacitor 162 exhausts its charge. This latter event will be explained in more detail later. When either of these two events happen, transistor 190 turns off.

If, on the other hand, $\overline{FFS}$ or Z applied to terminals 170 and 174 go true (0 volt) the gate is blocked and a $\overline{P_P}$ term applied to terminal 160 will only cause the voltage at junction 166 to be at —0.3 volt (not graph D of FIGURE 8). This places the base of transistor 190 at 0.4 volt from the original 1 volt as shown in graph C of FIGURE 8 and thus transistor 190 remains off. The 0.4 volt being the 0.7 volt drop across diode 178 above the 1 volt at junction 166. It should be here noted that the state of the inhibit terms $\overline{FFS}$ or Z prior to the time of the occurrence of $\overline{P_P}$ time is immaterial. Junction 166 will or will not be clamped at 0.3 volt by the states of the inhibit terms $\overline{FFS}$ and Z only at $\overline{P_P}$ time. There is no recovery associated with the inhibit input and the gate responds simultaneously.

A change of the inhibit term $\overline{FFS}$ or Z on terminal 170 or 174 during $\overline{P_P}$ time will immediately be reflected to the output of terminal 196.

The waveforms on the circuit of FIGURE 7 are shown by way of example in FIGURE 8. The quiescent voltage at junction 166 is 0.3 volt and at the base of transistor 190 is 1 volt. This is shown in FIGURE 8 at graph C and at graph D. In the case of an open gate the first 1.3 volts of downward swing during $\overline{P_P}$ time are wasted as this is the excursion of the base transistor 190 before it clamps to ground. The remainder of $\overline{P_P}$ time is available for transistor turn on. The current available at the base of transistor 190 is a current through resistor 164 minus the current through resistor 184, the turn-off current.

The time constant for the charge of capacitor 162 is $C(162) \times R(164)$. Remote cut-off of transistor 190 is avoided since as soon as current in the resistor 164 drops below the current of the resistor 184, cut-off of transistor 190 will result. Because the path of current flow from terminal 186 to ground through diodes 178 and diode 168 is isolated from the RC time constant of capacitor 162 and resistor 164 the recovery time of inhibit signals applied to terminal 160 is not reflected to transistor 190. Thus, transistor 190 responds to input signals with very little rise time. Because of the shortness of the pulse generated by the unique inhibit gate described the ONE-SHOT circuits are used for installation of the pulse shape for use with further logic circuitry.

Having thus described preferred embodiments of this invention what is claimed is:

1. A binary coded decimal FLIP-FLOP counter for counting pulses occurring at different times from two different pulse sources, comprising:
 a plurality of FLIP-FLOPS;
 a first gate network having individual gate circuits intercoupling said FLIP-FLOPS for binary coded decimal count up operation;
 a second gate network having individual gate circuits intercoupling said FLIP-FLOPS for binary coded decimal count down operation;
 a count up pulse input circuit coupled in parallel to each of said gate circuits of said first gate network;
 a count down pulse input circuit coupled in parallel to said gate circuits of said second gate network;
 a bi-stable switching device coupled to said FLIP-FLOPS for switching to a first stable state when the count of said counter is zero and for switching to a second stable state when the count of said counter is other than zero;
 gate circuits controlled by said counter and said bi-stable switching device for interchangeably coupling said two different pulse sources to said count up pulse input circuit and said count down pulse input circuit so that pulses from either source may cause said counter to count up and said counter always counts up from zero;
 each gate circuit having an output circuit and at least one enabling circuit diode coupled to said output circuit and having a pulse input circuit capacitor-resistor coupled to said output circuit so that the gate is opened or closed solely by inputs to said enabling circuit.

References Cited

UNITED STATES PATENTS

| | | | |
|---|---|---|---|
| 2,735,005 | 2/1956 | Steele | 250—27 |
| 3,272,971 | 9/1966 | Klinikowski | 235—92 |

MAYNARD R. WILBUR, Primary Examiner
J. M. THESZ, Jr., Assistant Examiner

U.S. Cl. X.R.

307—222